April 6, 1965  D. E. STINEBAUGH  3,176,671
INTERNAL COMBUSTION ENGINE
Filed Jan. 21, 1963  5 Sheets-Sheet 1

DONALD E. STINEBAUGH
INVENTOR.

BY

BUCKHORN, BLORE, KLARQUIST & SPARKMAN
ATTORNEYS

DONALD E. STINEBAUGH
INVENTOR.

BY
BUCKHORN, BLORE, KLARQUIST, & SPARKMAN
ATTORNEYS

April 6, 1965    D. E. STINEBAUGH    3,176,671
INTERNAL COMBUSTION ENGINE
Filed Jan. 21, 1963    5 Sheets-Sheet 4

DONALD E. STINEBAUGH
INVENTOR.

BY

BUCKHORN, BLORE, KLARQUIST & SPARKMAN
ATTORNEYS

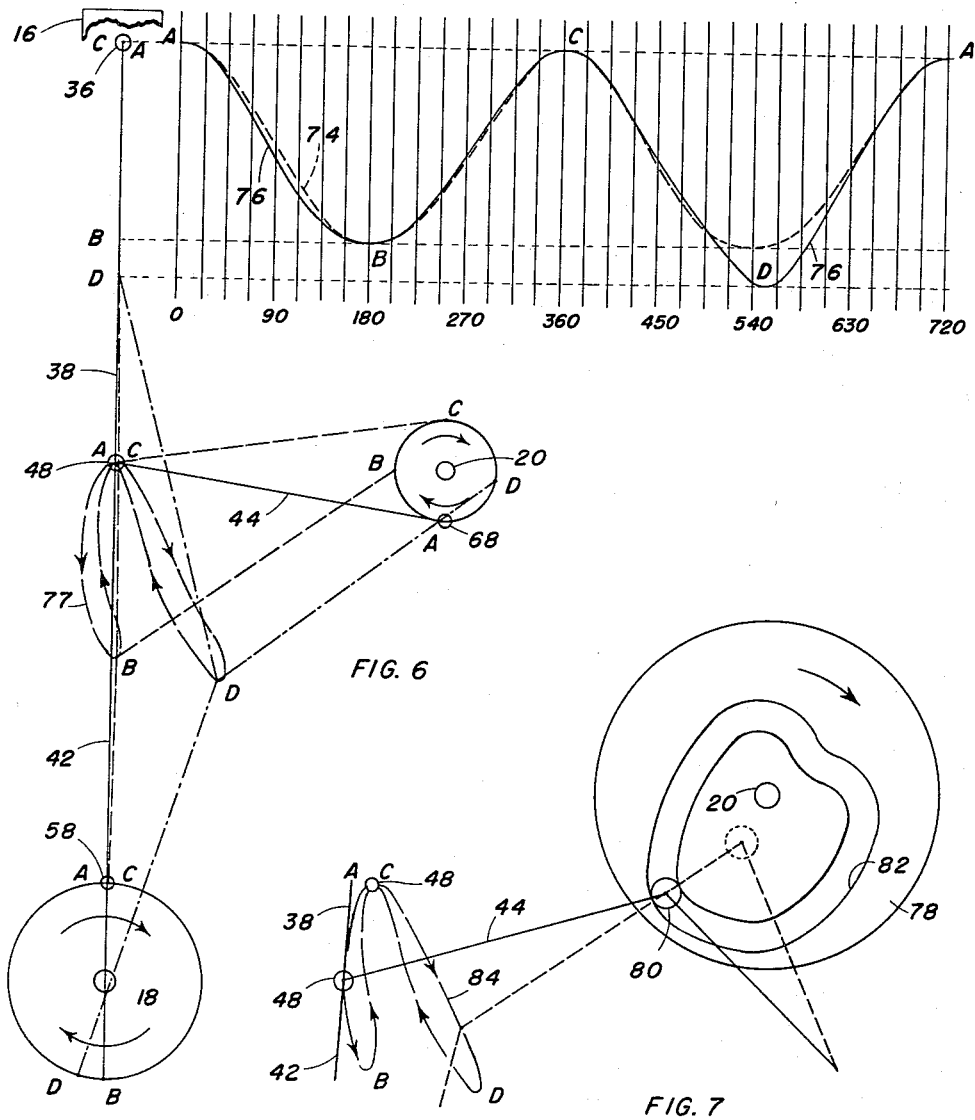

United States Patent Office 3,176,671
Patented Apr. 6, 1965

3,176,671
INTERNAL COMBUSTION ENGINE
Donald E. Stinebaugh, Coeur d'Alene, Idaho, assignor to Hilbee Corporation, Spokane, Wash., a corporation of Washington
Filed Jan. 21, 1963, Ser. No. 252,982
14 Claims. (Cl. 123—197)

This invention relates to an internal combustion engine and more particularly to an engine of the four stroke cycle type in which the various strokes of the cycle may all be of different lengths or may have different rates of piston movement relative to the rate of crankshaft rotation for corresponding positions of the crankshaft or both.

In a conventional internal combustion engine of the four stroke per cycle type having each piston connected directly to a crank of a crankshaft through a single connecting rod, the power stroke and intake stroke have identical total lengths so far as actual mechanical movement of the piston and crankshaft is concerned and the same is true of the exhaust and compression strokes. Thus all of the strokes have the same total length and piston movement approaches but differs slightly from simple harmonic motion. Also, it the axis of the cylinder and piston intersects the axis of the crankshaft, the exhaust and compression strokes are the inverses or mirror images of the power and intake strokes, respectively. If corresponding positions of the piston and crankshaft for the various strokes are considered to be at plus or minus the same angle of crankshaft rotation from the top dead center position of the associated crank of the crankshaft, then the rate of piston movement relative to the rate of crankshaft rotation is identical for all strokes at all corresponding positions of the piston and crankshaft. This places considerable limitations on the operating characteristics of the engine as will appear below.

In accordance with the present invention an internal combustion engine having a piston and crankshaft and a four stroke cycle is provided in which the lengths of the various strokes of the cycle may all be different, although the lengths of the power and exhaust strokes will usually not differ greatly and the same is true of the intake and compression strokes. The intake stroke can, however, be made of considerably greater length than the power stroke.

It is generally considered desirable for an internal combustion engine to have a power stroke which is short relative to piston diameter and many internal engines have a length of power stroke which is considerably shorter than the diameter of the piston. It is also generally considered desirable to introduce as large a charge of fuel and air into the cylinder during the intake stroke as is practical. The only ways to accomplish the latter objective with conventional carburetor type engines, other than employing supercharges with their attendant complications, is to cut down the frictional resistance to flow of air into the cylinders by employing multibarrel carburetors. In the engines of the present invention the power stroke may be made short or of any desired length within wide limits and at the same time the intake stroke can be made substantially longer than the power stroke so as to increase the fuel charge for a given length of power stroke. Even with diesel type engines this is effective to increase the charge of air for a given length of power stroke so as to enable more fuel to be injected.

In accordance with the present invention it is also possible to provide an engine in which the maximum rate of piston travel during the power stroke more nearly coincides with the maximum pressure produced by combustion of the fuel so as to provide more efficient conversion of fuel energy into mechanical energy.

The new results discussed above are accomplished by providing a two portion articulated connecting rod between the piston and associated crank of the crankshaft and varying the effective length of the connecting rod during the four stroke cycle by varying the angularity between the two portions of the connecting rod under control of a second shaft, such as the usual valve operating camshaft, rotating at one half the speed of rotation of the crankshaft. The control is exercised through a control rod having one end pivotally connected to the two portion connecting rod adjacent a pivotal connection providing the articulation between such two portions, the control rod extending generally laterally of such connecting rod. The other end of the control rod is moved laterally of the connecting rod portions by a crank or cam on the second shaft to thereby control the amount the pivotal connection between the two portions of the connecting rod is displaced laterally from a straight line joining the two ends of the connecting rod. The result is to vary the distance between the piston and crank of the crankshaft and the movement of the piston relative to crankshaft rotation.

It is therefore an object of the present invention to provide an improved internal combustion engine of the four stroke cycle type in which the rate of movement of the piston relative to the speed of rotation of the crankshaft is different for different strokes of the cycle at different corresponding positions of the crank in such cycles.

Another object of the invention is to provide an improved combustion engine of the four stroke cycle type in which the movement of the piston relative to crankshaft rotation during the intake stroke may be made different from that during the power stroke and in which the intake stroke is of greater total length than the power stroke.

A further object of the invention is to provide an improved internal combustion engine of the four stroke cycle type in which the rate of movement of the piston relative to the rate of rotation of the crankshaft during the power stroke as well as other strokes of the cycle may be raised from that of conventional engines so as to make the maximum rate of movement of the piston relative to the rate of crankshaft rotation more nearly coincide with the maximum pressure developed by combustion of the fuel mixture.

Other objects and advantages of the invention will appear in the following detailed description of embodiments thereof shown in the attached drawing of which:

FIG. 6 is a view similar to FIG. 5 showing the relative position of the elements of an engine similar to that of FIG. 4, but with the proportions of certain of the parts varied from that of FIG. 4; and FIG. 7 is a fragmentary view similar to that of FIG. 6 showing a control cam substituted for a control crank.

Figures 1, 2:
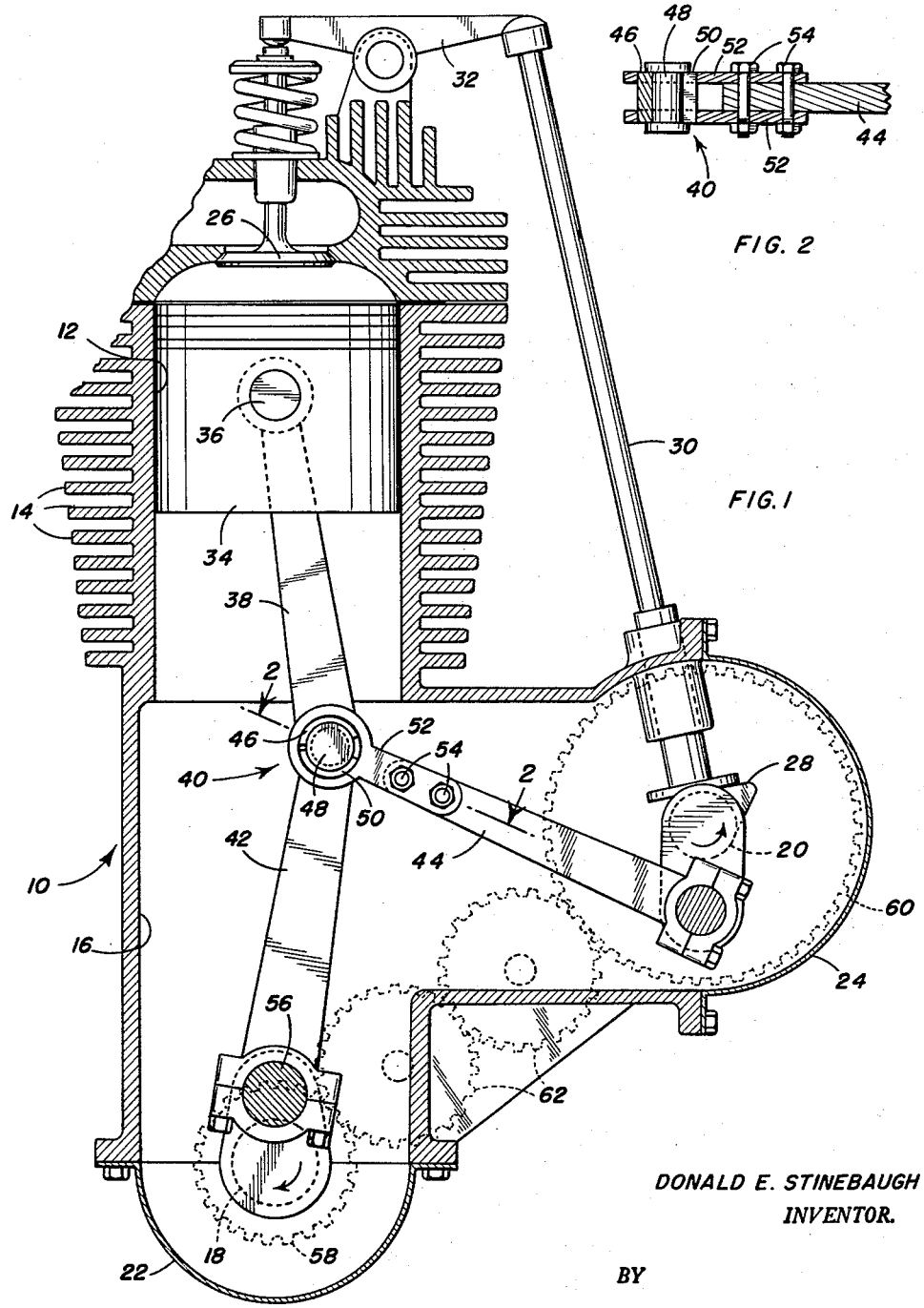
FIG. 1 is a vertical cross-sectional view through an internal combustion engine in accordance with the present invention.
FIG. 2 is a fragmentary sectional view through the pivot between the two parts of an articulated connecting rod and part of a control rod therefor taken on the line 2—2 of FIG. 1.

Referring more particularly to the drawings, the engine shown in FIGS. 1 and 2 includes a cylinder block 10 having a cylinder 12 therein surrounded by air cooling fins 14. The block 10 also provides a crankcase 16 in which a crankshaft 18 is journaled in bearing (not shown) and in which a camshaft 20 is also journaled in bearings (also not shown). The crankcase is provided with a detachable crankcase pan 22 and a detachable camshaft cover 24. Suitable valves 26, only one of which is shown, are operated from the camshaft 20 by cams 28, push rods 30 and rocker arms 32 as in conventional engines.

A piston 34 is positioned for reciprocation in the cylinder 12 and is pivotally connected by a piston pin 36 to one end of a first connecting rod portion 38. The connecting rod portion 38 has its other end pivotally connected by a pivot structure 40 to one end of a second connecting rod portion 42 and to one end of a control rod 44.

The details of the pivot structure 40 are most clearly shown in FIG. 2. The first connecting rod portion 38 terminates at its end forming part of the pivot structure 40 in a pair of laterally extending arcuate projections 46 providing, in conjunction with the central portion of the rod, an arcuate concave bearing surface concentric with and fitting a cylindrical outer bearing surface on a pivot pin 48. The second connecting rod portion 42 has a similar structure including a pair of arcuate projections 50 providing a bearing surface fitting the outer surface of the pivot pin 48. The arcuate projections 46 and 50 and the end bearing surfaces on the two connecting rod portions 38 and 42, respectively, are each less than 180° in circumferential extent so as to enable the ends of both rod portions to bear on the pivot pin 48 even when the rod portions are not in alignment with each other.

The pivot structure 40 also includes a pair of bearing members 52, each secured to one of two opposite sides of the end of the control rod adjacent the bearing structure 40. The bearing members 52 extend axially from the end of the rod 44 and have bores therethrough fitting and bearing upon outer convex arcuate surfaces on the projections 46 and 50 on the ends of the rod portions 38 and 42, respectively. The bearing members 52 are removably attached to the end of the control rod 44 by any suitable means, such as bolts 54. The pivot pin 48 has enlarged ends to hold it against axial displacement and it will be apparent that the bearing structure 40 can be assembled by first positioning the adjacent ends of the connecting rod portions 38 and 42 on the pivot pin 48 and then positioning the bearing members 52 on the projections 46 and 50 and thereafter securing them to the control rod 44.

The other end of the connecting rod portion 42 is journaled on a crank 56 on the crankshaft 18 and the other end of the control rod 44 is journaled on a crank 58 on the camshaft 20. Gears 58 and 60 fixed on the crankshaft 18 and camshaft 20, respectively, are connected by a pair of meshing idler gears 62 so that the camshaft 20 is driven in the opposite direction of rotation of and at one half the speed of the crankshaft 18.

Figure 3:
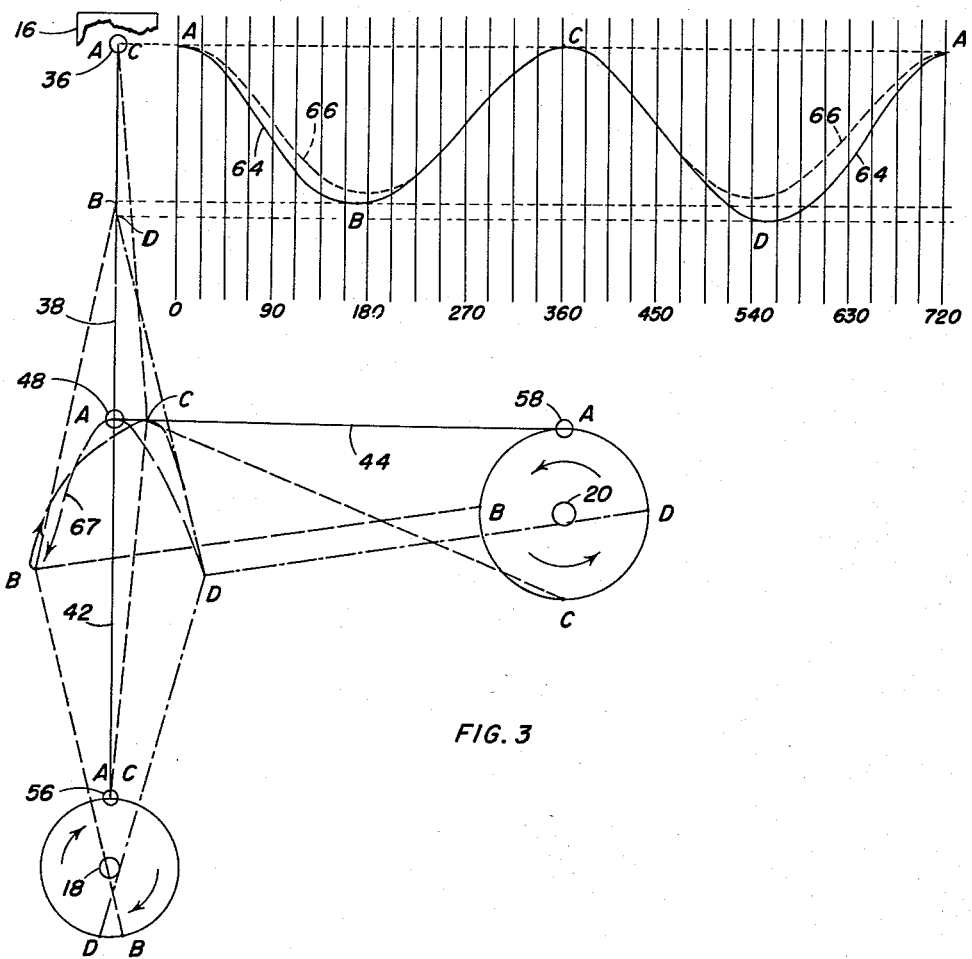
FIG. 3 is a diagrammatic view showing the relative positions of various elements of the engine of FIGS. 1 and 2 during a four stroke cycle.

In FIG. 3, four positions of the piston 16, crankshaft 18, camshaft 20, connecting rod portions 38 and 42, control rod 44 and pivot structure 40 are shown. Thus the corresponding positions of the piston pin 36, the crank 56 on the crankshaft 18, the crank 58 on the camshaft and the pivot pin 48 between the connecting rod portions 38 and 42 and the control rod 44 are indicated by the letter A, B, C, and D, respectively. Also piston movement relative to crankshaft rotation is shown by the full line curve 64 as compared to a piston movement curve 66 shown in dotted lines of a piston connected to the crank of a crankshaft having the same throw as the crank 56 by a connecting rod having the same length as the connecting rod portion 38. The positions of the piston pin 36, represented by the letters A to D referred to above, are also indicated on the curve 62.

The position A represents the top dead center of the piston just prior to the power stroke and in the embodiment of FIGS. 1 to 3, this occurs when the cranks 56 and 58 are also in their top positions. The position B represents the lowermost position of the piston following the power stroke and it will be noted that the power stroke occurs during substantially less than 180° of crankshaft rotation. The piston movement curve 64 therefore has a greater slope during the power stroke than the slope of the comparison curve 66 even if plotted on the same vertical scale as the curve 66. The exhaust stroke between positions B and C occurs during a crankshaft rotation greater than 180°, but for the most part follows the comparison curve 66 very closely. The position C of the piston representing the top dead center of the piston at the end of the exhaust stroke is slightly below the position A of the piston at the beginning of the power stroke as discussed above, but a slight change in the phase relationship or relative angular positions of the camshaft 20 and crankshaft 18 will place the position C of the piston at the same height as the position A of the piston or even above such position, if desired, without greatly modifying the shape of the other portions of the curve 64.

The intake stroke between the positions C and D is substantially greater as to both actual length of stroke and the angle of rotation of the crankshaft than with conventional engines, as is indicated by the comparison curve 66. This means a greater volumetric displacement during the intake stroke than during the power stroke so as to enable a short power stroke while at the same time providing a longer intake stroke for greater charge intake. The greater angle of crankshaft rotation during the intake stroke also provides more time for entrance of the intake charge. The compression stroke between the positions D and A is also of greater length than the power stroke but occurs during approximately the same angle of angular rotation of the crankshaft as the power stroke. The path of pivot pin 48 of the pivot structure 40 of FIG. 1 is shown at 67 in FIG. 3.

Figure 4:
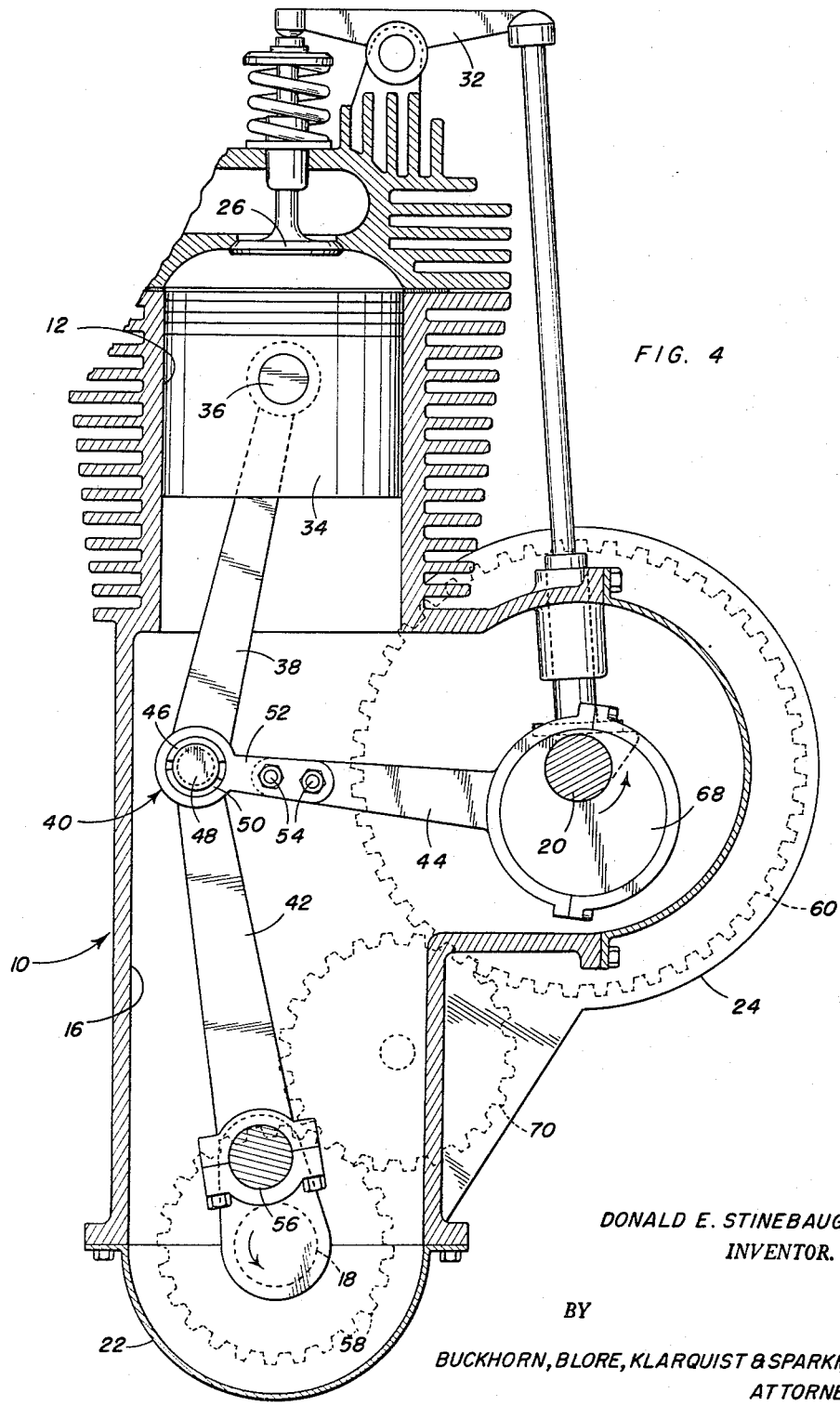
FIG. 4 is a view similar to FIG. 1 of a modified internal combustion engine.

The modification of the engine shown in FIG. 4, is similar to that shown in FIG. 1, and the same reference numerals have been used for corresponding parts. An eccentric 68 has however been substituted for the crank 58 on the camshaft 20 and the length of the connecting rod portions 38 and 42 and control rod as well as the throw of the crank 56 on the crankshaft 18 have been changed from those shown in FIG. 1. The throw of the eccentric 68 is also different from that of the crank 58 on the camshaft 20 of FIG. 1 and a single idler gear 70 is positioned between and meshes with the gears 58 and 60 on the crankshaft 18 and camshaft 20, respectively, so that the camshaft rotates in the same direction as the crankshaft.

Figure 5:
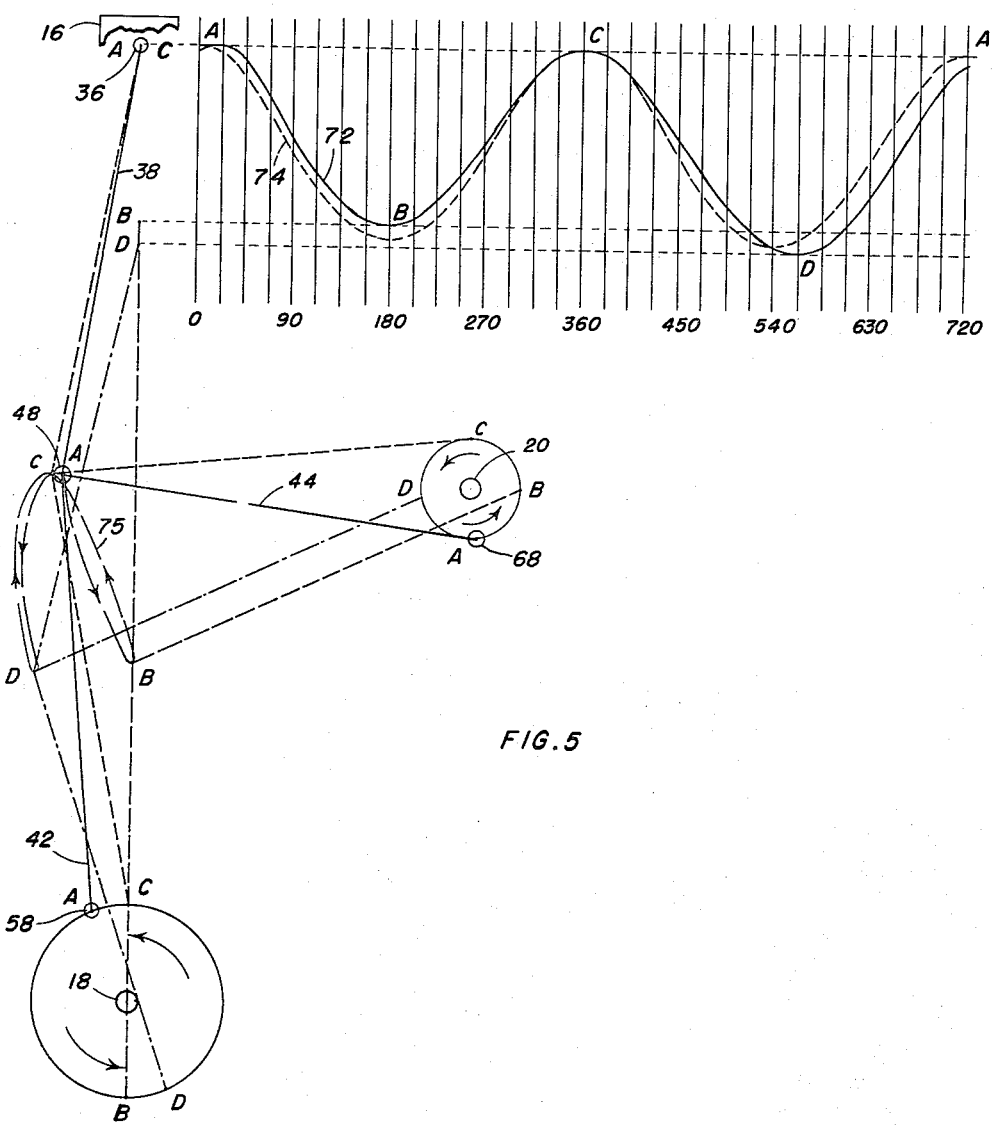
FIG. 5 is a view similar to FIG. 3 showing the relative position of elements of the engine of FIG. 4 during a four stroke cycle.

Four positions of the moving elements of the engine of FIG. 4 are also indicated in FIG. 5 and are also designated by the letters A, B, C and D. Such positions are the extreme positions of the piston 16 as represented by the piston pin 36. It will be noted that the power stroke between the positions A and B of the full line curve again occurs during substantially less than 180° of crankshaft rotation so that its slope is greater than the comparison dotted line curve 74, plotted in a manner similar to the curve 66 of FIG. 3, even if both curves were plotted with the same vertical scale. The exhaust stroke between the positions B and C occurs during approximately 180° of rotation of the crankshaft and approaches the comparison curve during its latter part. The intake stroke between the positions C and D is again of greater length than the power stroke and occurs during crankshaft rotation substantially greater than 180°. The compression stroke between D and C occurs during substantially 180° of crankshaft rotation and is also of greater length than the power stroke. The curve 72 is very nearly the same form as the comparison curve during the latter part of the compression stroke. The path of the pivot pin 48 of the engine of FIG. 4 is shown at 75 in FIG. 5.

The curve 76 of FIG. 6 is obtained by merely shortening the control rod 44 from that indicated in FIG. 5 so that the connecting rod portions 38 and 42 are in alignment when the crank 58 is in its uppermost position and the eccentric 68 is in its lowermost position. The effect is to make the power stroke curve between the positions A and B very nearly the same as the comparison curve 74 of a conventional engine and the same is true of the exhaust stroke between positions B and C. The intake stroke between the positions C and D is, however, of considerably greater length than the power stroke and also occurs during substantially greater than 180° of crankshaft rotation. The compression stroke between positions D and A is also of greater length than the power stroke but the piston movement curve during the latter part of the compression stroke very closely follows the comparison curve 74. This means that the connecting rod portions 38 and 42 are very nearly in alignment with each other during the time that the pressure in the cylinder is approaching the maximum compression pressure. The fact that the piston movement curve during the power stroke between positions A and B also closely follows the comparison curve 74 also means that the connecting rod portions 38 and 42 are very nearly in alignment during the entire power stroke. These two conditions further mean that there is very little force or reaction transmitted longitudinally of the control rod 44 during the power stroke or the compression stroke so that the eccentric 68 of FIG. 4 does not need to be constructed to withstand the large forces transmitted between the crankshaft and the piston through the connecting rod portions. The path of the pivot pin 48 of the modification of FIG. 6 is indicated at 77.

FIG. 7 diagrammatically shows a modification in which a face cam 78 fixed on the camshaft and a cam follower roller 80 journaled on an end of the control rod 44 and positioned in a groove 82 in the face of the cam 78 are substituted for the eccentric 68 of FIGS. 4 to 6. The path of the groove 82 may be made such as to maintain the connecting rod portions 38 and 42 in exact alignment during the power stroke and the last half or two-thirds of the compression stroke so as to substantially eliminate the transmission of large forces to the cam follower 80 and face cam 78 through the control rod 44. The path of the pivotal connection 48 as a result of the cam actuation of FIG. 7 is shown at 84 in such figure.

It will be apparent that the shape of the groove 82 can be varied so as to obtain a wide variety of different stroke lengths and slopes of the piston movement curves during the various strokes and that similar results can be obtained by varying the relative proportions of the crank or eccentric throws and their phase relationships in the modifications of FIGS. 1 to 6 in conjunction with variations in the lengths of the connecting rod portion and control rod as the position of the camshaft relative to crankshaft and piston. Thus in FIGS. 1 to 3 varying the position of the camshaft either vertically or horizontally or both with the other elements unchanged, will vary the shape of the piston movement curve. It is thereby possible to obtain a wide variety of piston movement curves, only a few of the possible variations being shown in the drawings.

With respect to FIG. 5, it is apparent that the control rod 44 can be shortened or the camshaft 20 moved to the right so that the connecting rods 38 and 42 are in alignment when the piston is at top dead center at the beginning of the power stroke and while the corresponding crank position indicated by the point A is a substantial angle past the top center partition of the crank indicated by the point C. This can be accomplished without material modification of the curve 72 and one result would be that the two connecting rods will remain in substantial alignment during most of the power stroke. Also the maximum pressure due to the combustion of the fuel occurs when the crank is past the top center position so as to reduce bearing pressure on the various bearings.

Even with the modifications shown in the drawings, changes in operation can be accomplished. For example by merely changing the timing of the valves and ignition, if employed, the stroke between the positions C and D indicated on the various piston movement curves can be made the power stroke. The stroke between the positions D and A then becomes the exhaust stroke, the stroke between the positions A and B becomes the intake stroke and the stroke between the positions B and C becomes the compression stroke. By reversing the rotation of the engine, again with suitable changes in timing of valves and ignition, the stroke between the positions C and B may be made the power stroke with the exhaust stroke between the positions B and A, etc. Alternatively the stroke between the positions A and D can be made the power stroke with the stroke between the positions D and C the exhaust stroke, etc. It is thus possible to select a cycle of four strokes of the piston which gives maximum performance. In general, this will occur when the intake stroke is substantially longer and presents for a greater angle of crankshaft rotation than the power stroke and when the maximum rate of movement of the piston relative to the rate of crankshaft rotation during the power stroke very nearly coincides with the maximum pressure in the cylinder produced by combustion of the charge of fuel and air.

In all of the modifications discussed above it will be noted that the piston movement relative to crankshaft rotation differs in alternate strokes of the piston in the same direction.

I claim:

1. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivoted connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, said actuating means serving to move said control rod to provide the same predetermined starting point of said piston for both the power stroke and the intake stroke thereof and cause the intake stroke to be a predetermined length substantially longer than the power stroke.

2. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, said actuating means including a crank rotated at one half the speed of rotation of said crankshaft and having said other end of said control rod journaled thereon, said actuating means serving to move said control rod to provide the same predetermined starting point of said piston for both the power stroke and the intake stroke thereof and cause the intake stroke to be a predetermined length substantially longer than the power stroke.

3. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, said actuating means including an eccentric rotated at one half the speed of rotation of said crankshaft and having said other end of said control rod connected thereto, said actuating means serving to move said control rod to cause the positions of said piston relative to said cylinder at the start of the power stroke and the intake stroke to be the same and the intake stroke to be substantially longer than the power stroke.

4. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, said driving means including a cam rotated at one half the speed of said crankshaft and a cam follower on said other end of said control rod and engaging said cam, said actuating means serving to move said control rod to cause the positions of said piston relative to said cylinder at the start of the power stroke and the intake stroke to be the same and the intake stroke to be substantially longer than the power stroke.

5. A four stroke internal combustion engine having a cylinder, a piston reciprocable in said cylinder, a rotatable crankshaft and a camshaft driven from said crankshaft at half the speed of rotation of said crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement relative to crankshaft rotation which starts at the same position of said piston relative to said cylinder in the power and intake strokes and differs in alternate strokes of said piston in the same direction, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, and including means on said camshaft for moving the other end of said control rod laterally of said connecting rod.

6. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivoted connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction and in which said piston is in the same position relative to said cylinder at the start of both the intake stroke and the power stroke, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, said actuating means including a member rotated in the same direction as said crankshaft and having a portion disposed eccentrically of the axis of rotation of said member for causing said moving of the other end of said control rod.

7. A four stroke internal combustion engine in accordance with claim 6 in which said member of said actuating means is an eccentric.

8. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivoted connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction and in which said piston is in the same position relative to said cylinder at the start of both the power stroke and the intake stroke, said means including a control rod having one end pivotally connected to said connecting rod adjacent said pivotal connection between said portions and extending generally laterally of said connecting rod, and including actuating means driven from said crankshaft for moving the other end of said control rod laterally of said connecting rod, said actuating means including a member rotated in the opposite direction from the direction of rotation of said crankshaft and having a portion disposed eccentrically of the axis of rotation of said member to cause said moving of the other end of said control rod.

9. A four stroke internal combustion engine in accordance with claim 8 in which said member of said actuating means is a crank.

10. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction and in which the intake stroke of said piston is of greater length than the power stroke of said piston and the position of said piston relative to said cylinder is the same at the start of both the intake stroke and the power stroke.

11. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement relative to crankshaft rotation which differs in alternate strokes of said piston in the same direction, and in which the intake stroke of said piston starts at the same position of said piston relative to said cylinder as the power stroke and is of greater length than the power stroke of said piston and occurs during a greater angle of rotation of said crankshaft than the angle of rotation of said crankshaft during said power stroke.

12. A four stroke internal combustion engine having a cylinder, a piston reciprocable in said cylinder and a rotatable crankshaft, said engine also including the improvement comprising:

a two portion connecting rod connecting said piston to said crankshaft and converting reciprocatory piston movement into crankshaft rotation, a pivotal connection between said portions positioned intermediate the length of said connecting rod, and means driven from said crankshaft for moving said pivotal connection laterally of said connecting rod during said cycle to produce piston movement which starts at the same point in both the power stroke and intake stroke and is of less length during the power stroke of said piston than the piston movement during the intake stroke of said piston.

13. In a four stroke internal combustion engine including a cylinder having a head end and a crankcase end, a rotatable crankshaft, and a piston reciprocable in said cylinder, the combination therewith of a two portion connecting rod connected pivotally directly to said piston and said crankshaft and having a pivotal joint connecting the two portions thereof pivotally together, a control rod connected to said connecting rod, and control means movable in timed relation to the rotation of said crankshaft for varying the angular relationship of the two portions of said connecting rod to permit said piston to move from the same predetermined starting position adjacent said head end of said cylinder in the power and intake strokes a predetermined distance in the power stroke and a substantially longer distance than said predetermined distance in the intake stroke.

14. In a four stroke internal combustion engine including a cylinder having a head end and a crankcase end, a rotatable crankshaft, and a piston reciprocable in said cylinder, the combination therewith of a two portion connecting rod connected pivotally directly to said piston and said crankshaft and having a pivotal joint connecting the two portions thereof pivotally together, a control rod connected to said connecting rod, and means for moving the control rod in timed relation to the rotation of said crankshaft to control the angularity of the two portions of said connecting rod to cause said piston to move from a predetermined extreme first position adjacent said head end of said cylinder in both the power and intake strokes of said piston to an extreme second position a predetermined distance away from said first position in the power stroke and to an extreme third position spaced from said first position a distance substantially greater than said predetermined distance in the intake stroke.

References Cited in the file of this patent

UNITED STATES PATENTS

| | | |
|---|---|---|
| 1,648,141 | Martin | Nov. 8, 1927 |
| 1,755,942 | Woolson | Apr. 22, 1930 |
| 2,005,000 | Miller | June 18, 1935 |